United States Patent
Owens

(10) Patent No.: US 10,555,129 B2
(45) Date of Patent: Feb. 4, 2020

(54) BEACONING SYSTEM AND METHOD

(71) Applicant: Beeconz Inc., Los Angeles, CA (US)

(72) Inventor: Charles L. Owens, Los Angeles, CA (US)

(73) Assignee: Beeconz Inc., Los Angeles, CA (US)

( * ) Notice: Subject to any disclaimer, the term of this patent is extended or adjusted under 35 U.S.C. 154(b) by 0 days.

(21) Appl. No.: 16/375,497

(22) Filed: Apr. 4, 2019

(65) Prior Publication Data

US 2019/0313211 A1    Oct. 10, 2019

Related U.S. Application Data

(60) Provisional application No. 62/655,084, filed on Apr. 9, 2018.

(51) Int. Cl.
| | | |
|---|---|---|
| *H04W 24/00* | (2009.01) | |
| *H04W 4/029* | (2018.01) | |
| *H04W 12/00* | (2009.01) | |
| *H04W 4/021* | (2018.01) | |

(52) U.S. Cl.
CPC .......... *H04W 4/029* (2018.02); *H04W 4/021* (2013.01); *H04W 12/00503* (2019.01)

(58) Field of Classification Search
CPC ................. H04W 4/029; H04W 4/021; H04W 12/00503
USPC ..................................................... 455/456.2
See application file for complete search history.

(56) References Cited

U.S. PATENT DOCUMENTS

| | | | |
|---|---|---|---|
| 7,489,939 B2* | 2/2009 | Ashley, Jr. | ............ G01S 5/0027 |
| | | | 455/456.6 |
| 8,612,147 B2 | 12/2013 | Som | |
| 9,307,360 B1 | 4/2016 | Zhyshko | |
| 9,906,907 B2* | 2/2018 | Trussel | ............... H04L 63/0807 |
| 2007/0162226 A1 | 7/2007 | Chen | |
| 2008/0133124 A1 | 6/2008 | Sarkeshik | |
| 2009/0082037 A1 | 3/2009 | Ju et al. | |
| 2013/0013202 A1 | 1/2013 | Som | |
| 2016/0150363 A1 | 5/2016 | Hughes et al. | |
| 2018/0188352 A1* | 7/2018 | Amir | ......................... G01S 5/16 |
| 2018/0199171 A1* | 7/2018 | Annamalai | ............. G01S 1/042 |
| 2018/0356520 A1* | 12/2018 | Booij | ..................... G01S 7/003 |

* cited by examiner

*Primary Examiner* — Amancio Gonzalez
(74) *Attorney, Agent, or Firm* — Trenner Law Firm, LLC; Mark D. Trenner

(57) ABSTRACT

An example beaconing method includes establishing a location via real-time geolocation of a mobile device at a remote location. The beaconing method also includes generating a non-derivative transmission-location code for the location that does not rely on any actual GPS or address information to establish makeup of the transmission-location code. The beaconing method also includes associating data of at least one of: destination, event time, and real-time tracking data with the transmission-location code. The beaconing method also includes conveying the transmission-location code to one or more user. The beaconing method also includes allowing the one or more user to enter the conveyed transmission-location code. The beaconing method also includes displaying data associated with the transmission-location code, the data including at least one of destination, event time, and real-time tracking and/or location data, in response to receiving the transmission-location code.

20 Claims, 9 Drawing Sheets

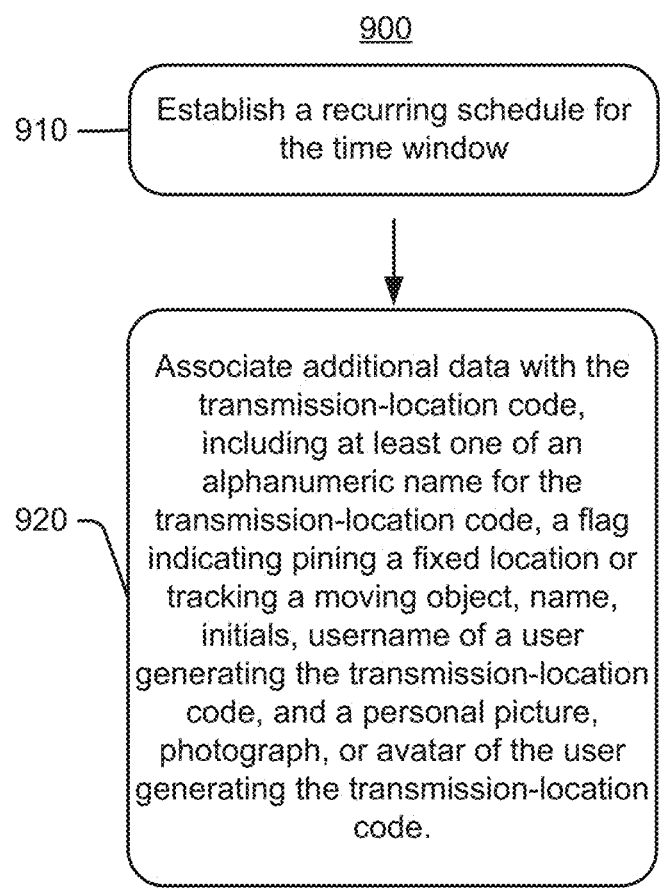

BEACONING SYSTEM AND METHOD

PRIORITY CLAIM

This application claims the priority benefit of U.S. Provisional Patent Application No. 62/655,084 filed Apr. 9, 2018 and titled "Beaconing System and Method" of Charles L. Owens, hereby incorporated by reference in its entirety as though fully set forth herein.

BACKGROUND

It is often useful to know the location of a mobile service, retail location, event, person, or route. Furthermore, it is often useful to share the location of the mobile service, retail location, event, person, or route.

There are location finding and location sharing options available, but are typically limited to fixed geographic locations and/or fixed points in time. As such, geolocation data used to track a moving object is tied to specific times the location data is captured.

No mechanism currently exists to communicate a mobile or stationary location across uncertain time intervals extending into the past and future, or to track events and routes that may occur at uncertain times and locations as of the time of transmission.

BRIEF DESCRIPTION OF THE DRAWINGS

FIGS. 7-9 are flowcharts illustrating example operations which may be implemented by a beaconing system to share the current location of a mobile device or service and/or person associated with the mobile device or service, and to share the future location of the mobile device or service and/or person associated with the mobile device or service in conjunction with any of the current location(s).

DETAILED DESCRIPTION

Figure 1:
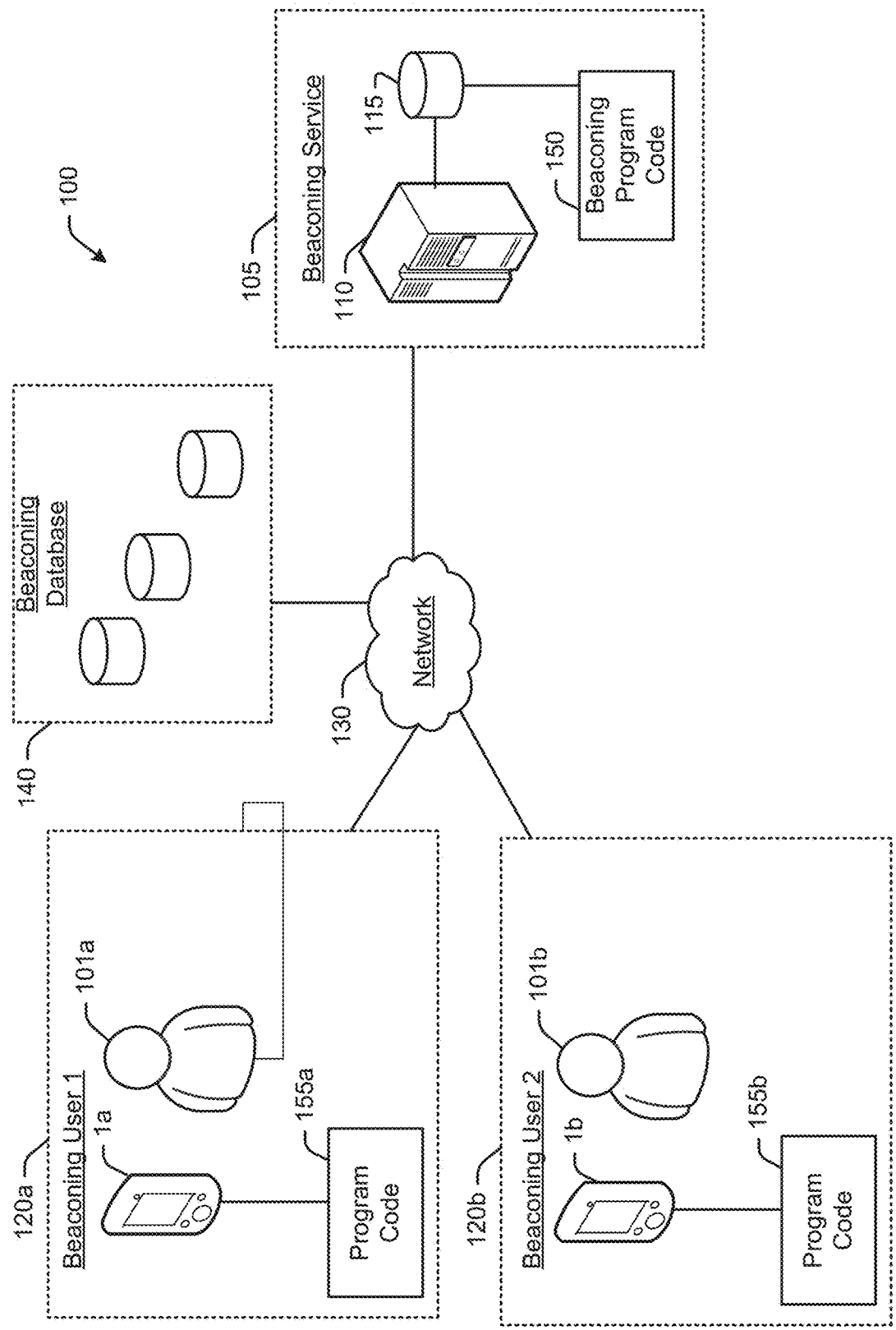
FIG. 1 is a high-level block diagram of an example networked computer system which may be implemented by a beaconing system to share the current location of a mobile device or service and/or person associated with the mobile device or service, and to share the future location of the mobile device or service and/or person associated with the mobile device or service in conjunction with any of the current location(s).

A beaconing system is disclosed, that enables users to share the current location of a mobile device or service and/or person associated with the mobile device or service, and to share the future location of the mobile device or service and/or person associated with the mobile device or service in conjunction with any of the current location(s). The current location may include that of an establishment (e.g., retail location), event, person(s), route, and/or other "mobile target" for which tracking is desired.

In an example, the beaconing system can share this location information by assigning a random or pre-selected transmission-location code. This transmission-location code can be shareable either publicly or privately, regardless of whether the sending party, the receiving party, and/or the object of the code are stationary or mobile.

In an example, the transmission-location code may be algorithmically converted from location, address, and/or latitude/longitude data. In another example, the transmission-location code may be a previously saved, non-derivative numeric and/or alphanumeric code that can be random or pre-selected. A non-derivative code that does not rely on any actual GPS or address information to establish the makeup of the code, may be implemented to indicate, identify, and track a stationary and/or mobile target. The code can be shared publicly and/or privately through a full range of options, including but not limited to social media, websites, email, messaging, in-app, person-to-person, and/or by physically posting the code.

The beaconing system and method disclosed herein solves the issue of not knowing the exact and current location (e.g., of a mobile service, retail location, event, or person). It does this by assigning a random or pre-selected code that is shareable either publicly or privately whether they are stationary or mobile. The conversion of a location, address or latitude/longitude, or a preset or previously saved location into a numeric or alphanumeric code that can be either random or pre-selected is unique to this system and method. The location can be stationary or mobile. The code can be shared publicly or privately through a full range of options including but not limited to, social media, websites, email, messaging, in-app P2P or by physically posting the code. The system and method creates a random or pre-selected code that does not rely on any actual GPS or address information to establish the makeup of that code, therefore, it can be used to identify & track a stationary or mobile location.

The system and method generates a numeric/alphanumeric code that is distributed for sharing the "Setter's" location weather "Pinned" or mobile. It is a temporary "Address" that can be relocated. This code is not derived from any actual GPS coordinates so it can be used constantly or repeatedly no matter their location. By way of illustration, a Los Angeles food truck could go to New York and use the same code in both locations. This code can be leased and customized by the user and since the code is attached to an account, it is not fully dependent on a specific device or its current location. Once set, if "pinned" the code is not dependent on the location of the users device.

In an example, there are two tiers: 1) receive a new, random code every time you set a code, and 2) create a custom code that is leased.

The system and method tracks the mobile device, but can also remember a previous and/or preset location. Users can set their app to either "track" (e.g., follow their mobile device's location) or "pin" (e.g., use a predefined location no matter the location of the mobile device). The location can either be set on site or remotely by inputting an address or using a pre-tagged location. The user has the option to update their location if their app is set to "Pin". All other settings are also editable.

In an example, users can set a duration for either a one-time event or set a recurring schedule. The user can set multiple "Remote Code" at once on the same device.

In an example, the system and method generates a code that is tied to the "setting" users account and is sharable publically (social media, text, email) and is visible to people in the area who select the "Public" button.

The second user inputs this code into the app to generate its live or stored location information. The "setters" is predetermined.

Before continuing, it is noted that as used herein, the terms "includes" and "including" mean, but are not limited to, "includes" or "including" and "includes at least" or "including at least." The term "based on" means "based on" and "based at least in part on."

FIG. 1 is a high-level block diagram of an example networked computer system which may be implemented by a beaconing system 100 to share the current location of a mobile device or service and/or person associated with the mobile device or service, and to share the future location of the mobile device or service and/or person associated with the mobile device or service in conjunction with any of the current location(s).

Beaconing system 100 may be implemented with any of a wide variety of computing devices, such as, but not limited to, stand-alone desktop/laptop/netbook computers, workstations, server computers, blade servers, mobile devices, and appliances (e.g., devices dedicated to providing a service), to name only a few examples.

Each of the computing devices may include memory, storage, and a degree of data processing capability at least sufficient to manage a communications connection either directly with one another or indirectly (e.g., via a network). At least one of the computing devices is also configured with sufficient processing capability to execute the program code described herein.

In an example, the beaconing system 100 may include a host 110 providing a beaconing service 105 accessed by a person 101a-b via a client device 120a-b. For purposes of illustration, the beaconing service 105 may be an online data processing service executing on a host 110 configured as a server computer with computer-readable storage 112.

Example services may include general purpose computing services (e.g., access to maps and other sources of data sets hosted on the Internet or as dynamic data endpoints for any number of client applications). Services also include interfaces to application programming interfaces (APIs) and related support infrastructure which were previously the exclusive domain of desktop and local area network computing systems, such as application engines (e.g., maps), and hosted social media services, telecommunications, etc.

The beaconing user 120a-b may be one or more user with a suitable computer or computing device 1a, 1b capable of accessing the host 110. Host 110 and beaconing user 120a-b are not limited to any particular type of devices. Although, it is noted that the operations described herein may be executed by beaconing program code 155a-b residing on the client device 1a, 1b (e.g., a mobile device such as a tablet or phone), respectively.

The beaconing system 100 may also include a communication network 130, such as a local area network (LAN) and/or wide area network (WAN). In one example, the network 130 includes the Internet or other mobile communications network (e.g., a 3G or 4G mobile device network). Network 130 may also provide greater accessibility to the beaconing service 105 for use in distributed environments, for example, where more than one user may have input and/or receive output from the beaconing service 105.

The host 110 and beaconing user 120a-b may be provided on the network 130 via a communication connection, such as via an Internet service provider (ISP). In this regard, the beaconing user 120a-b is able to access host 110 directly via the network 130, or via an agent, such as another network.

In an example, the beaconing program code 150 has access to both the beaconing user 120a-b and the beaconing service 105 in the networked computer system. For example, the beaconing service 105 may be a cloud-based service, wherein the program code is executed on at least one computing device local to the beaconing user 120a-b, but having access to the beaconing service 105 in the cloud computing system.

Before continuing, it is noted that the computing devices are not limited in function. The computing devices may also provide other services in the system 100. For example, host 110 may also provide transaction processing services and email services for the beaconing user 120.

In addition, the beaconing service 105 may include at least one remote source 115 of content, and/or the beaconing service 105 may be operable to communicate with at least one remote beaconing database 140 of content. That is, the beaconing database 140 may be part of the beaconing service 105, and/or the beaconing database 140 may be physically distributed in the network and operatively associated with the beaconing service 105. In any implementation, the source may include any content. For example, the beaconing database 140 may include databases for providing information, applications for providing application data, storage resources for providing online storage facilities. There is no limit to the type or amount of content that may be provided by the source. In addition, the content may include unprocessed or "raw" data, or the content may undergo at least some level of processing.

As mentioned above, the beaconing program code 150 may be executed by any suitable computing device to identify access patterns by the beaconing user 120a-b for content at a remote source. In addition, the program code may serve one or more than one beaconing user 120a-b.

Figure 2:
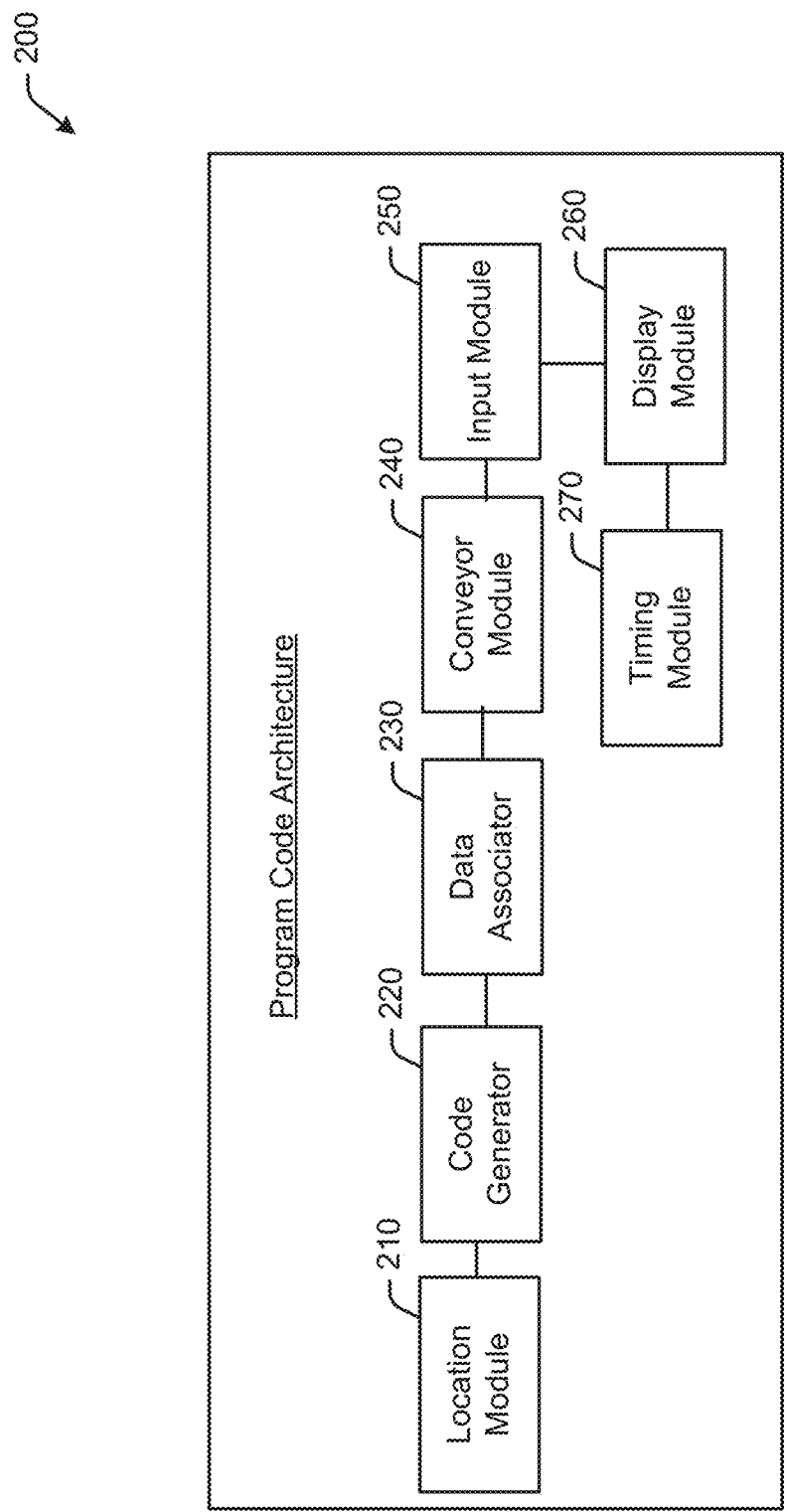
FIG. 2 shows an example architecture of machine readable instructions, which may be executed by a beaconing system to share the current location of a mobile device or service and/or person associated with the mobile device or service, and to share the future location of the mobile device or service and/or person associated with the mobile device or service in conjunction with any of the current location(s).

Program code used to implement features of the system can be better understood with reference to FIG. 2 and the following discussion of various example functions. However, the operations described herein are not limited to any specific implementation with any particular type of program code.

FIG. 2 shows an example architecture 200 of machine readable instructions, which may be executed by a beaconing system to share the current location of a mobile device or service and/or person associated with the mobile device or service, and to share the future location of the mobile device or service and/or person associated with the mobile device or service in conjunction with any of the current location(s). In an example, the program code discussed above with reference to FIG. 1 may be implemented in machine-readable instructions (such as but not limited to, software or firmware).

The machine-readable instructions may be stored on a non-transient computer readable medium and are executable by one or more processor to perform the operations described herein. It is noted, however, that the components shown in FIG. 2 are provided only for purposes of illustration of an example operating environment, and are not intended to limit implementation to any particular system.

The program code executes the function of the architecture of machine readable instructions as self-contained modules. These modules can be integrated within a self-standing tool, or may be implemented as agents that run on top of an existing program code. In an example, the architecture 200 of machine readable instructions may include a location module 210 to establish a real-time geolocation of a mobile device of a first user (e.g., via global positioning unit, IP address, data entry of a desired remote location or address, and/or selection of a location from a list).

The architecture 200 of machine readable instructions may include a code generating module 220 to generate a non-derivative transmission-location code for the location. In an example, the generated code does not rely on any actual GPS or address information to establish the makeup of the transmission-location code The architecture 200 of machine readable instructions may include a data association module 230 to associate data with the transmission-location code. In an example, the data includes at least one of destination, event time, and real-time tracking data The architecture 200 of machine readable instructions may include a conveying module 240 to convey the transmission-location code to one or more other devices The architecture 200 of machine readable instructions may include an input module 250 to enter a conveyed transmission-location code The architecture 200 of machine readable instructions may include a display module 260 to display the data including at least one of destination, event time, and real-time tracking data after verifying the entered transmission-location code.

The architecture 200 of machine readable instructions may include an timing module 270 to associate one or more start times and stop times with the transmission-location code. The module 270 may define time windows permitting or denying access to and display of the data associated with the transmission-location code. In an example, the duration of the time window may be any amount of time.

In an example, additional data may be associated with the transmission-location code. The additional data may include at least one of an alphanumeric name for the transmission-location code, a flag indicating pinning a fixed location for a moving mobile device, tracking a moving mobile device, name, initials, and/or username of the first user, and a personal picture, photograph, and/or avatar of the first user.

In an example, the transmission-location code can be canceled before or after sharing the transmission-location code. Other users who properly enter the transmission-location code are not granted access to the data associated with the transmission-location code. The data associated with the transmission-location code is editable either before or after sharing the transmission-location code.

Figure 3:
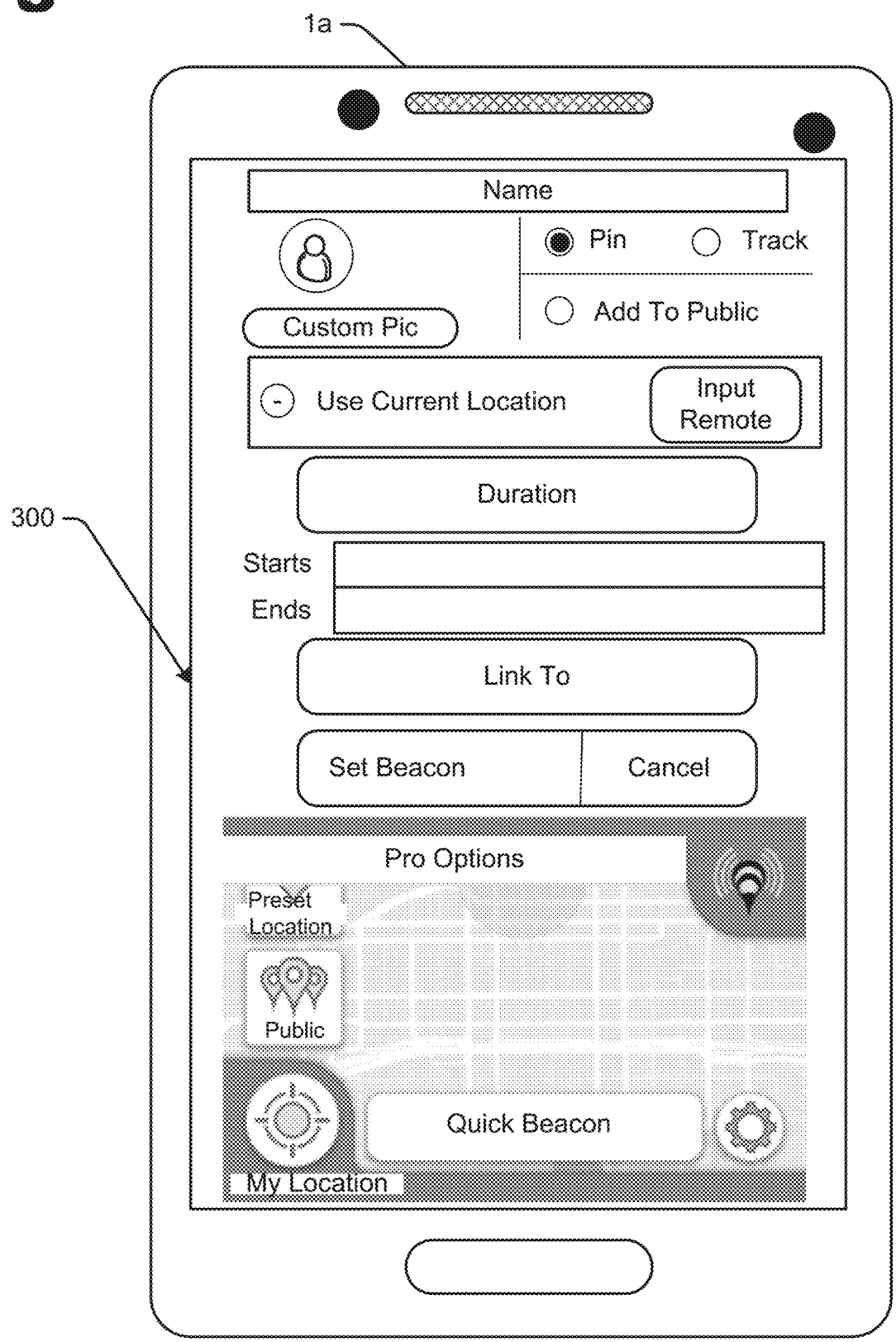
FIG. 3 is an example data entry user interface which may be implemented by a beaconing system.

FIG. 3 is an example implementation of a data entry user interface 300 which may be implemented by the beaconing system. In an example, the user interface 300 is generated on a mobile device, such as but not limited to a mobile phone as illustrated in FIG. 3. The user interface 300 may include interactive icons for receiving input and generating output for the user, text input and output, and graphical output, e.g., a map. The user interface may also be configured to receive audible (e.g., voice) instruction and/or touch-screen input.

In the example shown in FIG. 3, the first user (User 1 in FIG. 1) may create their beacons based on their current geolocation or by inputting a remote beacon in the form of an address, latitude/longitude, or saved location. The first user may also set other options, and then click the "Set Beacon" icon to be taken the next user interface (e.g., illustrated in FIG. 4).

In an example, a first user of the beaconing system requests the system to generate a transmission-location code, either based on their current geolocation or by inputting a remote location in the form of an address, latitude/longitude, or by selecting a saved location from a list. The first user may also set other options, including but not limited to an alphanumeric name for the transmission-location code, public sharing, to pin or "pining" a fixed location vs. "tracking" a moving object, as well as selecting the first user's personal initials and/or a personal picture, photograph, or avatar.

In addition, the first user may input a starting and ending time for a "window" of availability for the shared transmission-location code. In an example, during the duration of the time window, a second user of the beaconing system who enters the code is permitted to see the location and other information associated with the transmission-location code, and is forbidden from seeing the information outside the time window. In an example, once these options are selected and the transmission-location code is generated and shared, the first user's session is transferred to a verification user interface, an example of which is found herein as FIG. 4.

Before continuing, it should be noted that the examples described above are provided for purposes of illustration, and are not intended to be limiting. Other steps and/or configurations may be utilized to carry out the operations described herein.

Figure 4:
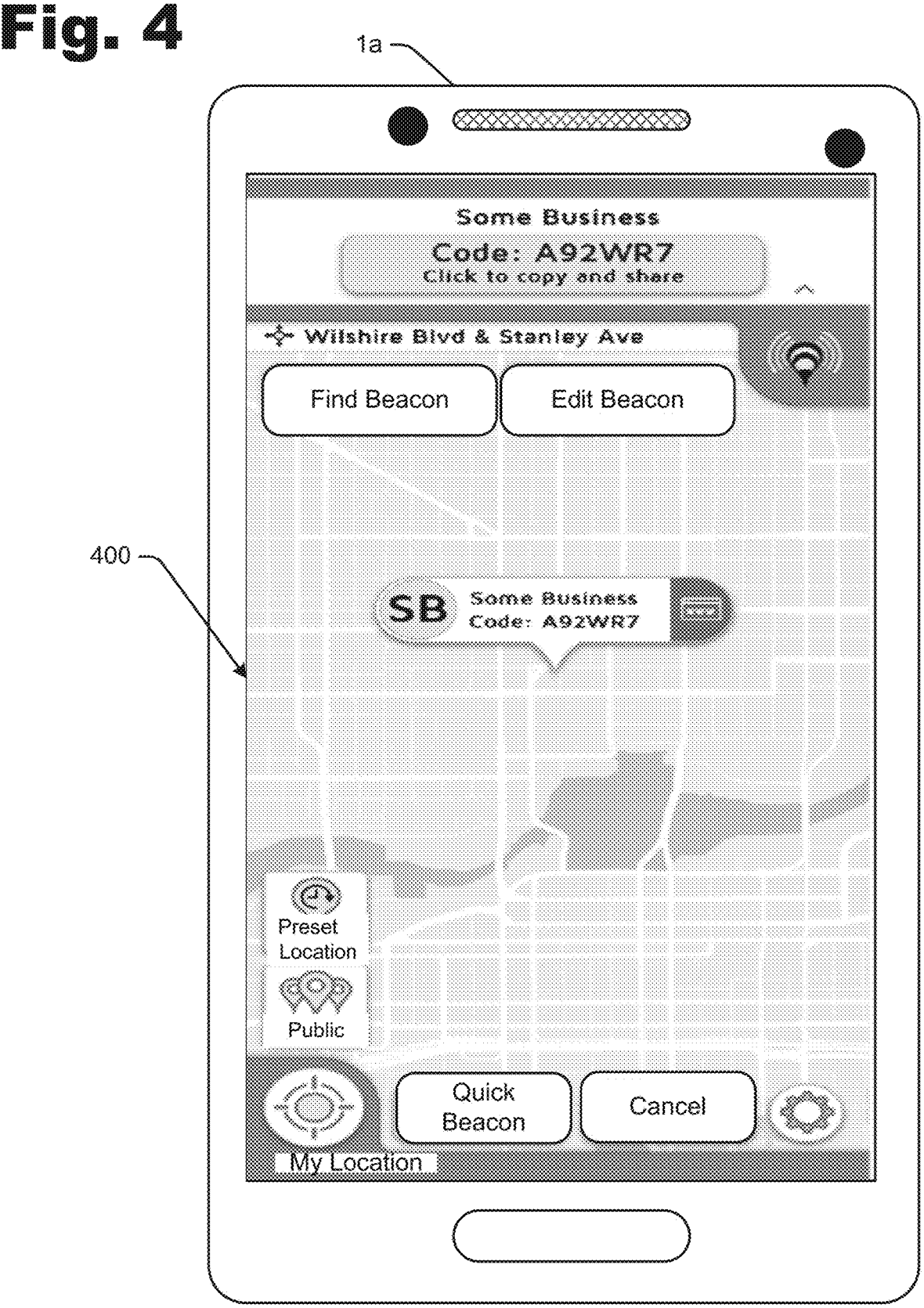
FIG. 4 is an example display user interface which may be implemented to verify entered data by the beaconing system.

FIG. 4 is an example implementation of a display user interface 400 which may be implemented to verify entered data by the beaconing system. In an example, the user interface 400 is generated on a mobile device, such as but not limited to a mobile phone as illustrated in FIG. 4. The user interface 400 may include interactive icons for receiving input and generating output for the user, text input and output, and graphical output, e.g., a map. The user interface may also be configured to receive audible (e.g., voice) instruction and/or touch-screen input.

In the example shown in FIG. 4, the created location (e.g., from FIG. 3) is converted into a Beacon Code. The Beacon Code may be random or preselected. The Beacon Code can be shared publicly or privately through a full range of options, including but not limited to, social media, websites, email, text messaging, or physical posting.

In an example, the transmission-location code of FIG. 3 has been created, and is now shown on a map, along with selected options depicted and described in FIG. 3. The code may be shared either publicly or privately through a wide range of options, including but not limited to, social media, websites, email, messaging, by physically posting the code, or by transmitting the code through the beaconing system itself. In an example, the first user also has the option of editing the information associated with the transmission-location code, or of canceling the code entirely, such that a second user entering the code is forbidden from seeing the information associated with the code, even during the previously specified "window" of available viewing times.

Figure 5:
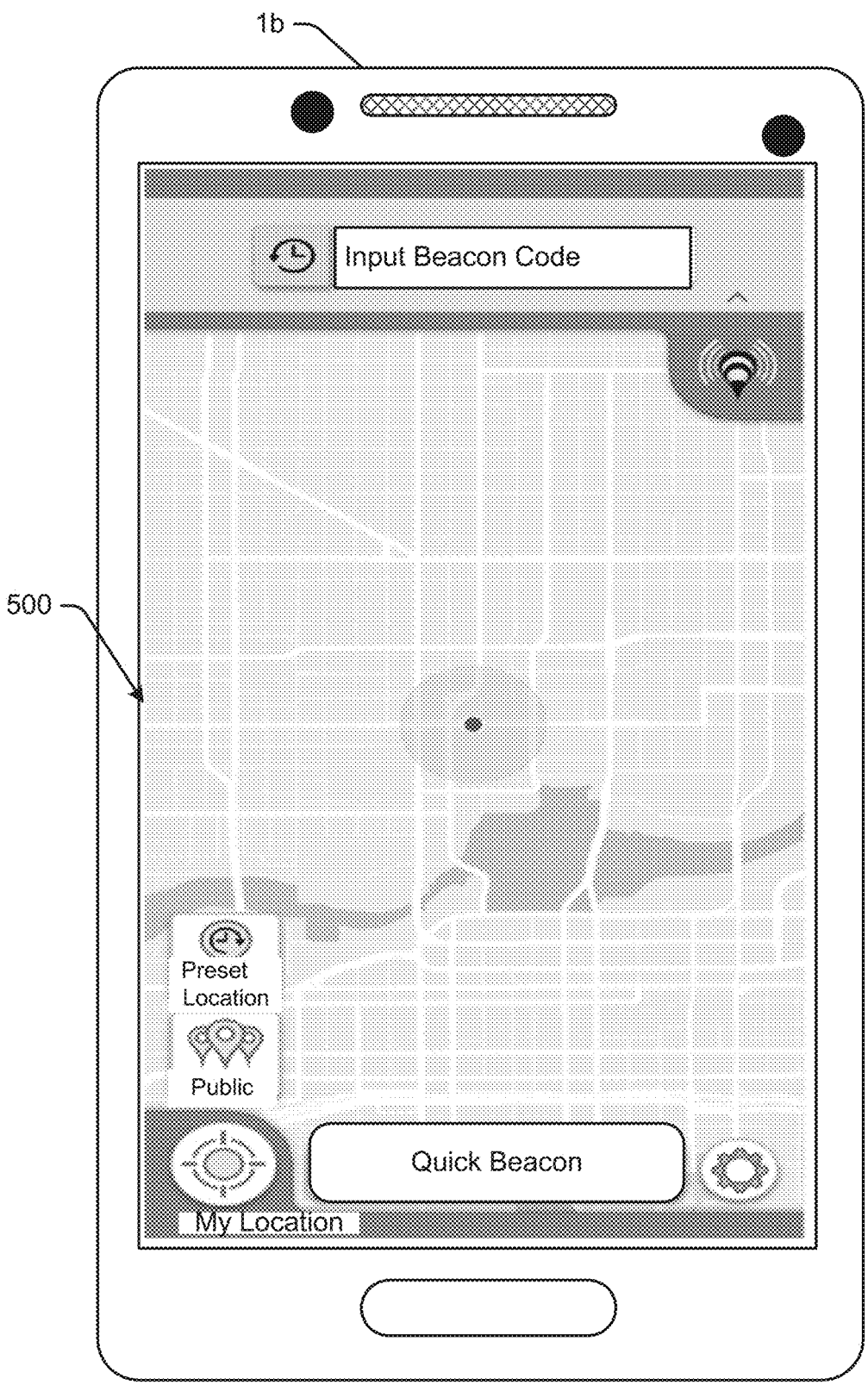
FIG. 5 is an example transmission-location code input user interface which may be implemented by the beaconing system.

FIG. 5 is an example implementation of a transmission-location code input user interface 500 which may be implemented by the beaconing system. In an example, the user interface 500 is generated on a mobile device, such as but not limited to a mobile phone as illustrated in FIG. 5. The user interface 500 may include interactive icons for receiving input and generating output for the user, text input and output, and graphical output, e.g., a map. The user interface may also be configured to receive audible (e.g., voice) instruction and/or touch-screen input.

In the example shown in FIG. 5, the second user (e.g., User 2 in FIG. 1) can input the Beacon Code generated by User 1 (e.g., from FIG. 4) into their version of the application (e.g., program code 155b in FIG. 1) to receive real-time location information and routing to the Beacond of User 1. For example, a customer may use this location information to find a mobile food truck for lunch.

In an example, a second user of the beaconing system, having received a transmission-location code from the first user of the beaconing system, can enter the transmission-location code and receive the information associated with the code. Examples include, but are not limited to, a meeting location, routing instructions to the meeting location, real-time information about the location of the first user. There is no way for one or more users to publicly see another user's information that is searching for or has executed the same code. The only way this could happen is if one user shares a code.

Figure 6:
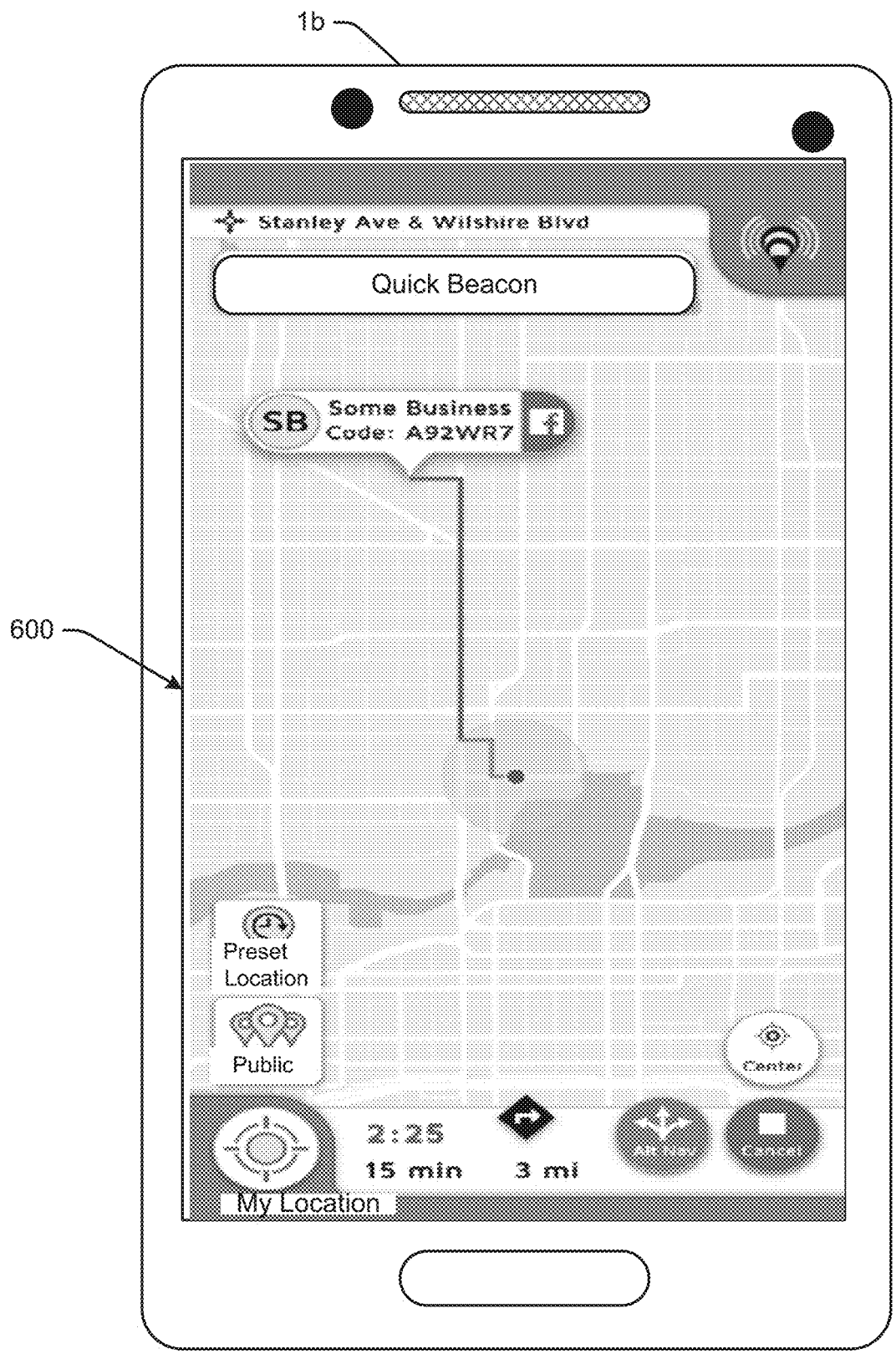
FIG. 6 is an example beacon tracking and sharing user interface which may be implemented by the beaconing system.

FIG. 6 is an example implementation of a beacon tracking and sharing user interface 600 which may be implemented by the beaconing system. In an example, the user interface 600 is generated on a mobile device, such as but not limited to a mobile phone as illustrated in FIG. 6. The user interface 600 may include interactive icons for receiving input and generating output for the user, text input and output, and graphical output, e.g., a map. The user interface may also be configured to receive audible (e.g., voice) instruction and/or touch-screen input.

In the example shown in FIG. 6, the second user (e.g., User 2 in FIG. 1) can also share the Beacon Code generated by User 1 (e.g., from FIG. 4) publicly or privately through a full range of options, just as User 1 did, including but not limited to, social media, websites, email, text messaging, or physical posting. For example, User 2 may send this information via an invitation to yet another user (e.g., User 3) so that they can meet at the food truck for lunch together.

In an example, once the second user of the beaconing system has entered a transmission-location code and unlocked the information associated with that code, the second user now has the ability to see locations on a map, receive and follow real-time routing instructions, see the location of the first user of the beaconing system, and other such information that the system enables the first user to share.

In addition, the second user of the beaconing system has the ability to share the information associated with the transmission-location code with additional users.

The images and operations shown and described herein are provided to illustrate example implementations. It is noted that the operations are not limited to the ordering shown. Still other operations may also be implemented.

By way of illustration, the beaconing system and method described herein may be implemented such that a mobile food truck may share its real-time location with a plurality of customers via a fixed transmission-location code. The same transmission-location code can be retained, e.g., even when traveling long distances (e.g., from one location to another, even between cities or states). Of course it will be readily understood by those having ordinary skill in the art after becoming familiar with the teachings herein, that the beaconing system and method may be implemented in any of a number of ways, for any of a variety of industries.

Figure 7:
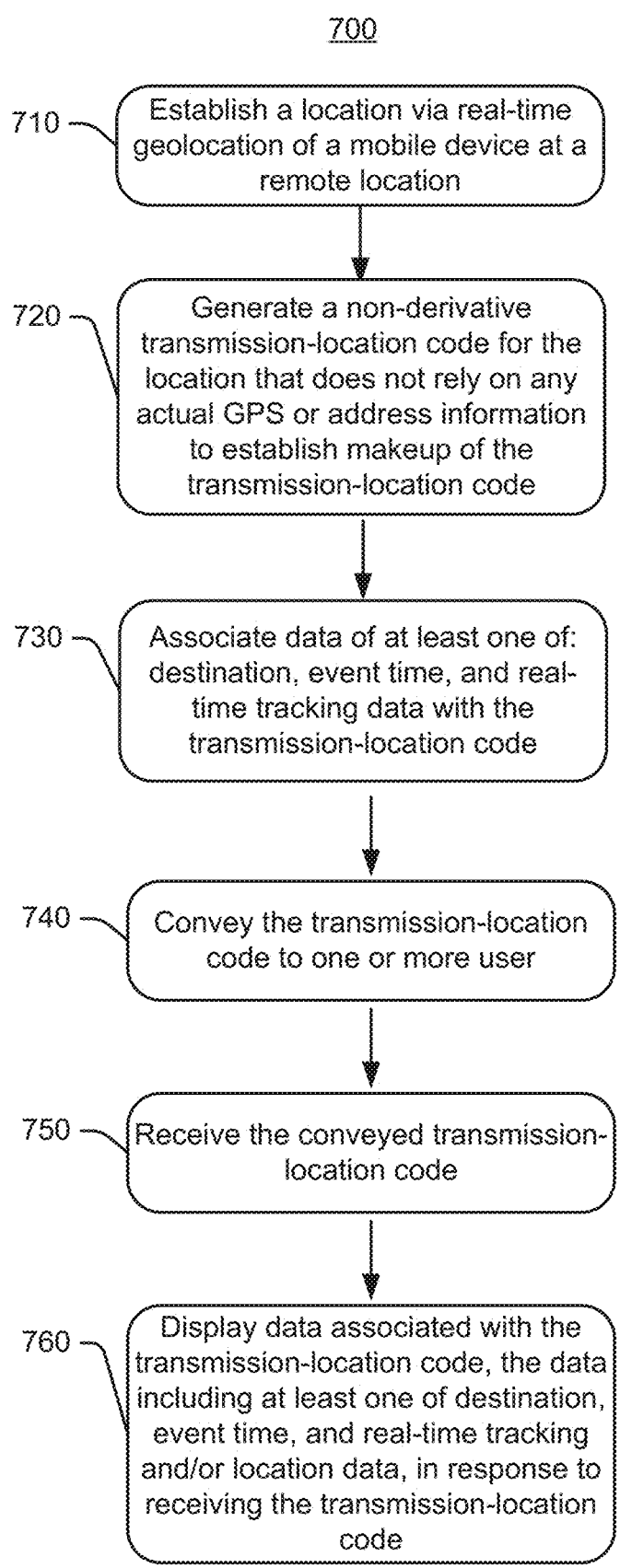
Figure 8:
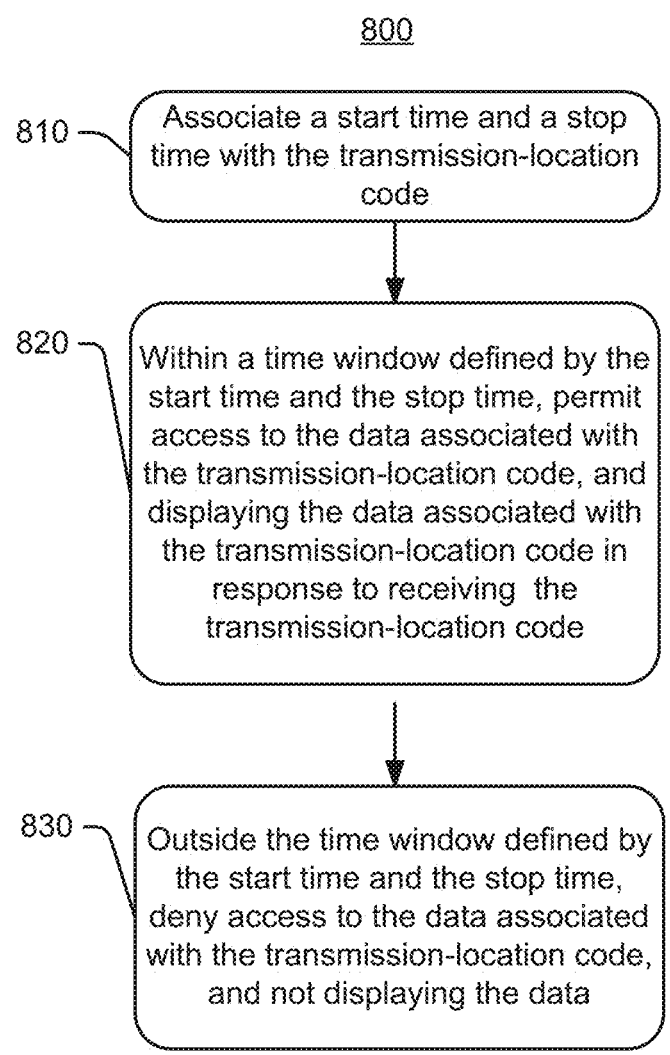

FIGS. 7-9 are flowcharts illustrating example operations which may be implemented by a beaconing system to share the current location of a mobile device or service and/or person associated with the mobile device or service, and to share the future location of the mobile device or service and/or person associated with the mobile device or service in conjunction with any of the current location(s). Operations 700, 800, and 900 may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

In FIG. 7, operation 710 includes establishing a location via real-time geolocation of a mobile device at a remote location. Operation 720 includes generating a non-derivative transmission-location code for the location that does not rely on any actual GPS or address information to establish makeup of the transmission-location code. Operation 730 includes associating data of at least one of: destination, event time, and real-time tracking data with the transmission-location code. Operation 740 includes conveying the transmission-location code to one or more user. Operation 750 includes allowing the one or more user to enter the conveyed transmission-location code. Operation 760 includes displaying data associated with the transmission-location code, the data including at least one of destination, event time, and real-time tracking and/or location data, in response to receiving the transmission-location code.

In FIG. 8, operation 810 includes associating a start time and a stop time with the transmission-location code. Operation 820 includes, within a time window defined by the start time and the stop time, permitting access to the data associated with the transmission-location code, and displaying the data associated with the transmission-location code in response to receiving the transmission-location code. Operation 830 includes, outside the time window defined by the start time and the stop time, denying access to the data associated with the transmission-location code, and not displaying the data. In an example, a duration of the time window is any amount of time determined by an end user.

In FIG. 9, operation 910 includes establishing a recurring schedule for the time window. Operation 920 includes associating additional data with the transmission-location code, including at least one of an alphanumeric name for the transmission-location code, a flag indicating pining a fixed location or tracking a moving object, name, initials, username of a user generating the transmission-location code, and a personal picture, photograph, or avatar of the user generating the transmission-location code.

In an example, the operations include establishing multiple remote locations on the same device.

The operations shown and described herein are provided to illustrate example implementations. It is noted that the operations are not limited to the ordering shown. Still other operations may also be implemented.

In an example, tracking a transmission-location code ties the transmission code to a specific mobile device.

In an example, pinning a transmission-location code ties the transmission-location code to a specific location that does not move, even if the mobile device that generated generating the transmission-location code moves to another location.

In an example, data entry of a desired location or address is pre-staged, wherein the desired location is selected from a database of pre-entered locations.

In an example, a pinned location is updated by one of a user, and the device that generated, entered, or selected the non-derivative transmission-location code for the location.

In an example, the data associated with a transmission-location code that has been flagged as "public" is visible to all users that select the "Public" button.

In an example, the transmission-location code is shared either publicly or privately through any one or more of social media, websites, email, electronic messaging, by posting the code in a physical location, and by transmitting the code through a beaconing system.

In an example, a user generating the transmission-location code may cancel the transmission-location code, such that access to the data associated with the transmission-location code is denied.

In an example, the shared data is presented graphically as one or more of locations on a map, real-time routing instructions, and real-time location of other users who have either generated or correctly entered the transmission-location code.

In an example, the transmission-location code is randomly generated.

In an example, a custom, non-randomly-generated transmission-location code is leased by a particular user account, and can be reused for other events or locations, and is not dependent on a specific device or its current location in order to be accessed or shared.

In an example, a custom, non-randomly-generated transmission-location code is assigned to a particular user account, and can be reassigned to other events or locations, and is not dependent on a specific device or its current location in order to be accessed or shared.

In an example, all data associated with the transmission-location code is editable before and after the code is shared with other users.

The operations may be implemented at least in part using an end-user interface (e.g., web-based interface). In an example, the end-user is able to make predetermined selections, and the operations described above are implemented on a back-end device to present results to a user. The user can then make further selections. It is also noted that various of the operations described herein may be automated or partially automated.

It is noted that the examples shown and described are provided for purposes of illustration and are not intended to be limiting. Still other examples are also contemplated.

The invention claimed is:

1. A beaconing method, comprising:
    establishing a location via real-time geolocation of a mobile device at a remote location;
    generating a non-derivative transmission-location code for the location that does not rely on any actual GPS or address information to establish makeup of the transmission-location code;
    associating data of at least one of: destination, event time, and real-time tracking data with the transmission-location code;
    conveying the transmission-location code to one or more user;
    allowing the one or more user to enter the conveyed transmission-location code; and
    displaying data associated with the transmission-location code, the data including at least one of destination, event time, and real-time tracking and/or location data, in response to receiving the transmission-location code.

2. The method of claim 1, further comprising:
    associating a start time and a stop time with the transmission-location code;
    within a time window defined by the start time and the stop time, permitting access to the data associated with the transmission-location code, and displaying the data associated with the transmission-location code in response to receiving the transmission-location code; and
    outside the time window defined by the start time and the stop time, denying access to the data associated with the transmission-location code, and not displaying the data;
    wherein a duration of the time window is any amount of time determined by an end user.

3. The method of claim 2, further comprising establishing a recurring schedule for the time window.

4. The method of claim 1, further comprising associating additional data with the transmission-location code, including at least one of an alphanumeric name for the transmission-location code, a flag indicating pining a fixed location or tracking a moving object, name, initials, username of a user generating the transmission-location code, and a personal picture, photograph, or avatar of the user generating the transmission-location code.

5. The method of claim 4, wherein tracking a transmission-location code ties the transmission code to a specific mobile device.

6. The method of claim 4, wherein pinning a transmission-location code ties the transmission-location code to a specific location that does not move, even if the mobile device that generated generating the transmission-location code moves to another location.

7. The method of claim 1, wherein data entry of a desired location or address is pre-staged, wherein the desired location is selected from a database of pre-entered locations.

8. The method of claim 6, wherein a pinned location is updated by one of a user, and the device that generated, entered, or selected the non-derivative transmission-location code for the location.

9. The method of claim 4, wherein the data associated with a transmission-location code that has been flagged as "public" is visible to all users that select the "Public" button.

10. The method of claim 1, wherein the transmission-location code is shared either publicly or privately through any one or more of social media, websites, email, electronic messaging, by posting the code in a physical location, and by transmitting the code through a beaconing system.

11. The method of claim 1, wherein a user generating the transmission-location code may cancel the transmission-location code, such that access to the data associated with the transmission-location code is denied.

12. The method of claim 1, wherein the shared data is presented graphically as one or more of locations on a map, real-time routing instructions, and real-time location of other users who have either generated or correctly entered the transmission-location code.

13. The method of claim 1, wherein the transmission-location code is randomly generated.

14. The method of claim 1, wherein a custom, non-randomly-generated transmission-location code is leased by a particular user account, and can be reused for other events or locations, and is not dependent on a specific device or its current location in order to be accessed or shared.

15. The method of claim 1, wherein a custom, non-randomly-generated transmission-location code is assigned to a particular user account, and can be reassigned to other events or locations, and is not dependent on a specific device or its current location in order to be accessed or shared.

16. The method of claim 1, wherein all data associated with the transmission-location code is editable before and after the code is shared with other users.

17. The method of claim 1, further comprising establishing multiple remote locations on the same device.

18. A beaconing system for sharing real-time location, event time, and routing data, comprising:
- a location established via real-time geolocation of a mobile device of a first user, or data entry of a desired remote location or address, or selection of a location from a list;
- a non-derivative transmission-location code generated for the location, that does not rely on any actual GPS or address information to establish the makeup of the transmission-location code;
- data associated with the transmission-location code, the data including at least one of destination, event time, and real-time tracking data;
- a conveying module to convey the transmission-location code to one or more other devices;
- an input module to enter a conveyed transmission-location code;
- a display module to display the data including at least one of destination, event time, and real-time tracking data after verifying the entered transmission-location code; and
- one or more start times and stop times associated with the transmission-location code which define time windows permitting or denying access to and display of the data associated with the transmission-location code;
- wherein the duration of the time window may be any amount of time.

19. The beaconing system of claim 18, further comprising additional data associated with the transmission-location code, the additional data including at least one of an alphanumeric name for the transmission-location code, a flag indicating pinning a fixed location for a moving mobile device, tracking a moving mobile device, name, initials, and/or username of the first user, and a personal picture, photograph, and/or avatar of the first user.

20. The beaconing system of claim 18, wherein the transmission-location code can be canceled before or after sharing the transmission-location code, such that other users who properly enter the transmission-location code are not granted access to the data associated with the transmission-location code; and
- wherein the data associated with the transmission-location code is editable either before or after sharing the transmission-location code.

* * * * *